(12) United States Patent
Liu et al.

(10) Patent No.: US 12,131,758 B2
(45) Date of Patent: Oct. 29, 2024

(54) FAST PARTIAL ERASURE FOR DRIVE SANITIZATION

(71) Applicant: Seagate Technology LLC, Fremont, CA (US)

(72) Inventors: Xiong Liu, Singapore (SG); Lihong Zhang, Singapore (SG); Quan Li, Singapore (SG); Wenxiang Xie, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/223,896

(22) Filed: Jul. 19, 2023

(65) Prior Publication Data
US 2024/0087598 A1    Mar. 14, 2024

Related U.S. Application Data

(60) Provisional application No. 63/406,401, filed on Sep. 14, 2022.

(51) Int. Cl.
*G11B 5/265* (2006.01)
*G11B 5/55* (2006.01)

(52) U.S. Cl.
CPC .......... *G11B 5/2654* (2013.01); *G11B 5/5547* (2013.01)

(58) Field of Classification Search
None
See application file for complete search history.

(56) References Cited

U.S. PATENT DOCUMENTS

| | | | | |
|---|---|---|---|---|
| 5,444,684 A | * | 8/1995 | Yanagi | G11B 11/10563 |
| 5,668,679 A | * | 9/1997 | Swearingen | G11B 5/59661 |
| | | | | 360/75 |
| 6,115,351 A | * | 9/2000 | Utsunomiya | G11B 7/2578 |
| | | | | 430/270.13 |
| 7,512,812 B2 | | 3/2009 | Sohn | |
| 8,018,617 B2 | | 9/2011 | Kortenoeven | |
| 9,530,436 B1 | | 12/2016 | Masiewicz | |
| 9,536,563 B1 | * | 1/2017 | Liu | G06F 11/1469 |
| 2004/0008594 A1 | * | 1/2004 | Tokita | G11B 7/1267 |
| 2004/0252617 A1 | * | 12/2004 | Kitagaki | G11B 7/0062 |
| | | | | 369/53.26 |
| 2005/0259528 A1 | * | 11/2005 | Fujita | G11B 7/08529 |
| | | | | 369/47.1 |
| 2007/0248785 A1 | * | 10/2007 | Nakai | G11B 7/2578 |
| 2010/0027150 A1 | * | 2/2010 | Deguchi | G11B 5/4555 |
| | | | | 360/75 |

* cited by examiner

*Primary Examiner* — Peter Vincent Agustin
(74) *Attorney, Agent, or Firm* — Mueting Raasch Group

(57) ABSTRACT

A method involves determining a threshold error rate that will result on data stored on a magnetic disk surface of a disk drive being unrecoverable. The method also involves determining a seek velocity that will overwrite sufficient portions of the data such the data will exhibit at least the threshold error rate. The disk drive performs at least one traversal of the magnetic disk surface with a head of the disk drive that emits an erase field during the at least one traversal at the seek velocity. The at least one traversal sanitizes the data.

20 Claims, 6 Drawing Sheets

FAST PARTIAL ERASURE FOR DRIVE SANITIZATION

RELATED PATENT DOCUMENTS

This application claims the benefit of U.S. Provisional Application No. 63/406,401, filed on Sep. 14, 2022, which is incorporated herein by reference in its entirety.

SUMMARY

The present disclosure is directed to a method that involves determining a threshold error rate that will result on data stored on a magnetic disk surface of a disk drive being unrecoverable. The method involves determining a seek velocity that will overwrite sufficient portions of the data such the data will exhibit at least the threshold error rate. The disk drive performs at least one traversal of the magnetic disk surface with a head of the disk drive that emits an erase field during the at least one traversal at the seek velocity. The at least one traversal sanitizes the data.

In another embodiment, a disk drive includes a reserved data storage that stores a seek velocity that will overwrite sufficient portions of data a magnetic disk surface of the disk drive such the data on will exhibit at least a threshold error rate that will result on the data being unrecoverable. The disk drive includes a controller coupled to a write head that is operable to write to the magnetic disk surface. The controller is operable to, in response to a sanitization command, perform at least one traversal of the magnetic disk surface with the write head emitting an erase field during the at least one traversal at the seek velocity. The at least one traversal sanitizes the data.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
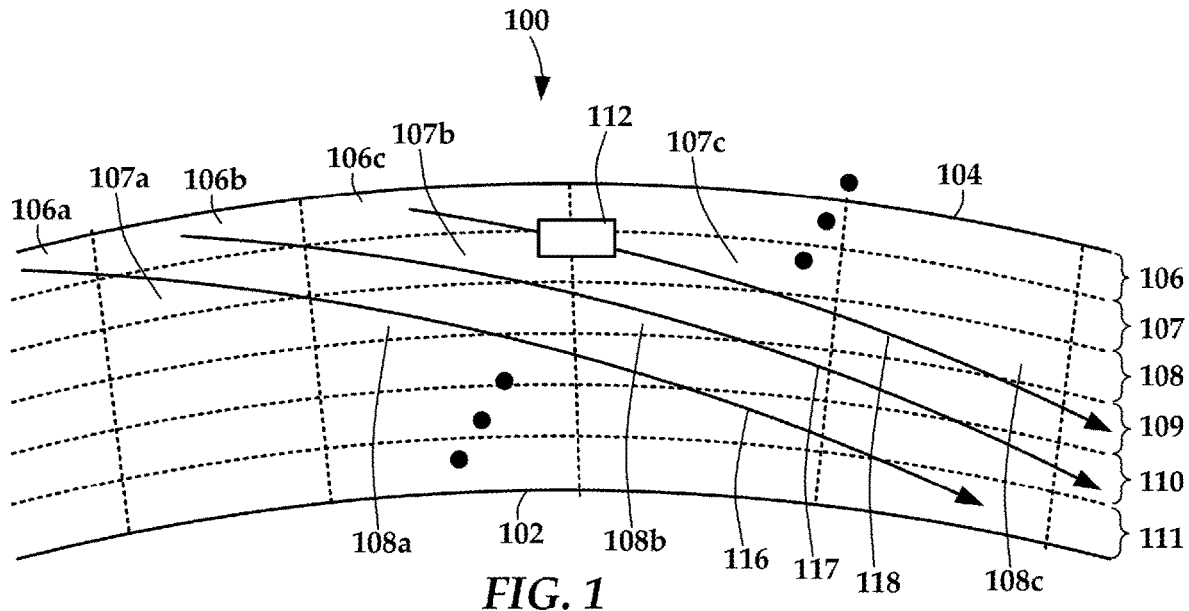
FIG. 1 is a diagram showing disk surface sanitization according to an example embodiment.

The present disclosure is generally related to data storage devices such as hard disk drives (HDDs). These drives stored data by applying a changing magnetic field from a recording head to the surface of a magnetic disk that is moving relative to the head. While HDDs may not match the performance of newer storage technologies such as solid-state drives (SSDs), the HDD is still the most cost-effective form of non-archival storage. Therefore, high capacity HDDs are widely utilized where large amounts of instantly accessible storage are required, e.g., in data centers.

One issue that is known for HDDs is that it can be cumbersome to sanitize the storage devices, e.g., to prevent recovery of sensitive data once the drive is no longer in use. Data sanitization generally refers to the destruction of user data when the data is no longer wanted or needed. In this disclosure, data sanitization generally refers to destruction on whole regions of the disks when the regions are put out of commission, such as the entire disk surface or portions thereof (e.g., drive partitions). This is opposed to sanitization at the file or directory level, which is generally done in-use. Current data sanitization methods include physical scrapping (e.g., crushing or shredding the drive), which is effective but not an environmentally friendly solution because it destroys what may be an operational drive that can be reused in a different application. Parts from an operational (or even failed) drive can be salvaged and reused, however most physical scrapping methods destroy all components in the drive for cost reasons, even though only the disks would need to be destroyed to sanitize the data.

Another data sanitization method is full data erasure, which involves overwriting each sector using the built in read/write heads of the drive. This can be effective for the majority of sanitization applications, however full data erasure has become an increasingly costly solution given the very large storage capacities of modern HDDs. For example, a 10 TB HDD may take 15 hours or more to be erased, depending on the number of erase passes used.

Embodiments described below include drive sanitization techniques that systematically create errors in all data sectors, so a threshold error rate of the data sectors is greater than the maximum readback error rate (e.g., 3%). An error rate margin (e.g., 3%) can be added to tolerate variations, resulting in a predictable erasure rate that approaches or achieves 100% unrecoverable sectors. In this example the maximum readback error rate is equal to the error rate margin, such that a threshold error rate is twice the maximum readback error rate, however lower or higher error rate margins may be used. The sanitization can be applied to whole disk surfaces, or parts thereof (e.g., cylinders, partitions, etc.). Since erasure of the entire data sector is not needed, a significant time savings can be achieved.

An HDD is generally designed to handle a certain number of errors when reading back data sectors, defined as the bit error rate (BER) and expressed as an exponential value, e.g., ratio of erroneous to correct bits is $10^{BER}$. For example, an HDD may set the design target or requirement of the BER around $-1.9$ with the maximum BER at $-1.5$. In such a scenario, it is assumed data with the BER higher than $-1.5$ could not be read back or recovered based on the read channel design. The maximum BER of $-1.5$ means that the HDDs are designed to tolerate around 3% error ($10^{-1.5} \approx 3\%$) for the data sectors. In other words, the data sectors would exhibit an unrecoverable data error (UDE) if their error rate is more than 3%.

The purpose of data erasure is to make the data unreadable or unrecoverable. As the data would become unreadable if the error rate is more than 3%, it is not necessary to erase the whole sector. For an HDD that is designed with the maximum BER at $-1.5$, erasing 3% of data in the data sectors may be enough to achieve data erasure with a high level of confidence. Note that even though some bits of the sectors would still be unchanged by this erasure, these unchanged bits on their own will not reveal the user data written in the sector. Generally, the user data goes through a number of transformations (e.g., randomization, encoding/decoding) in the write and read processes to allow data to be reliably recovered in the expected event of channel errors. Therefore, the bits written to the sectors are scrambled compared to the user data from which the sectors were derived. If these read channel transformations cannot complete due to excessive BER, none of the user data should be readable even in the event that some bits of information are unchanged by the erasure.

This partial erasure of data sectors can be accomplished by causing the writer to perform a spiral seek to cross all data sectors in a pre-defined velocity profile. The writer, which can be activated at the highest write/erasure current, will partially erase the data sectors as it crosses them. Use of the highest current when writing will cause the erase fields to exhibit their maximum size, thus increasing crosstrack coverage during erasure. This process will cause the data sectors to reach an error rate higher than the maximum recoverable error rate (e.g., BER=−1.5). Because the data on the recording medium is coded and fully randomized, the data sectors with the error rate higher than the critical point will become completely unrecoverable.

In FIG. 1, a diagram schematically shows a disk surface 100 that is erased using a procedure according to an example embodiment. Only a part of the disk surface 100 between an inner diameter 102 and an outer diameter 104 is shown here, but the concepts are applicable to a full disk surface and can be performed on multiple disk surfaces at a time, e.g., by a plurality of write heads positioned over the different surfaces by an actuator arm that is commonly driven by a voice coil motor or similar actuator.

The disk surface 100 is divided into tracks 106-111. Each track 106-111 is formed of a plurality of sectors (e.g., sectors 106a-c, 107a-c) that are circularly arranged around the disk surface 100. The disk surface 100 may also have other data written to the tracks 106-111 not shown here, such as servo marks that are used by the read/write head for, among other things, determining position over the disk surface 100. For example, a first servo mark may be located between sector 106a and sector 106b, a second service mark may be located between sector 106b and sector 106c, etc.

During the erasing process, a write head 112 writes erasing patterns (e.g., a pure tone signal at 1 T, 2 T, 4 T, etc., random signal) at the highest writing current from a first track 106 to the last track 111 in a spiral trajectory on disc, as indicated by trajectories 116-118. The ellipsis (three dots in a row) on either side of the trajectories 116 and 118 indicate that these paths are repeated over the entire surface. A similar convention is used for other figures in the present application to maintain clarity in the drawings.

After the erasure process, the user data which are coded and randomized on the disk will become mostly or completely unrecoverable. The proposed method is very fast as it may need ~6% of the processing time of a full-surface erasing method, so it can protect the user data with high efficiency. For example, a 10 TB HDD may take less than an hour to erase the entire drive using the technique shown in FIG. 1 for a 6% erasure rate. This is significantly less than 15 hours or more described above for a conventional full erasure. This type of partial erasure is also energy efficient due to its short process time and can be environmentally friendly because it does not require hardware destruction.

Figure 2:
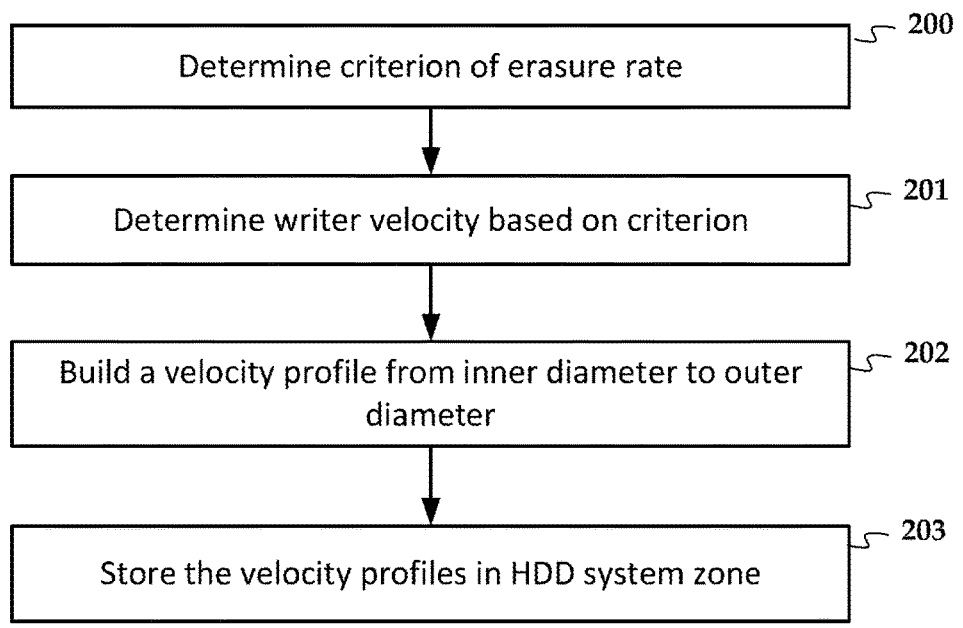
FIGS. 2 and 3 are flowcharts of sanitization operations according to example embodiments.

In FIG. 2, a flowchart shows details of preparing an HDD for an erasure procedure according to an example embodiment. The procedure involves determining 200 a criterion of the erasure rate. For example, the erasure rate may be defined that induces BER≥−1.5, which is an error rate of around 6% or more. The resulting error rate from the erasure will greater than the HDD maximum error rate (e.g., 3%) by a specific margin (e.g., another 3%) to tolerate variations. The margin can be added on to the maximum error rate, e.g., $BER_{erasure} \geq BER_{max} + BER_{margin}$, or be expressed as a ratio, e.g., $BER_{erasure} \geq N*BER_{max}$ where N=2.0, 2.2, 2.5, etc.

The next step in this procedure is to determine 201 the writer velocity ($Vel_w$), which is the seek velocity of the write head along the radial direction of the disk. Equations (1) and (2) below show how $Vel_w$ can be determined. The variable KFCI refers to kilo flux change per inch and is a measure of linear bit density, KTPI refers to kilo tracks per inch and is a measure of track density, code_rate refers to a percentage of the written data that is non-redundant, RPM refers to rotational velocity, and the R is the radius of the disk where head is currently positioned to perform the erasure.

$$Vel_W = \frac{4096 \times 8 \times Vel_M}{\text{code\_rate} \times KFCI \times \text{erasure\_rate} \times KTPI} \quad (1)$$

$$Vel_M = \frac{2\pi \times R \times RPM}{60} \quad (2)$$

A specific example is used to illustrate determination of $Vel_w$ and how it can change for different tracks. Assume a drive has disk rotational velocity of 7200 RPM, disk outer diameter (OD)=1.838", code_rate=83.4%, linear bit density=2435 KFCI, and track density=480 KTPI. Assume erasure_rate=6% (as defined in step 200 in FIG. 2), then writer velocity $Vel_w$, will be 2.98 inches per second (ips) at the OD. The value of $Vel_w$ will be reduced to 2.08 ips at the middle diameter (1.287"). These values of $Vel_w$ are much lower than the maximum seek velocity (e.g., >100 ips), so control of the erasing process is well within the capability of the drive's existing servo control.

The process in FIG. 2 further involves building 202 a velocity profile from OD to inner diameter (ID) based on the above equations for each surface. The velocity profiles are stored 203 in the HDD system zone, for example during certification testing of the drive. The HDD system zone is a reserved storage area on the disks (or on some other non-volatile medium of the drive) that is for internal use by the HDD firmware. The system zone stores various system parameters used during operation of the drive.

Figure 3:
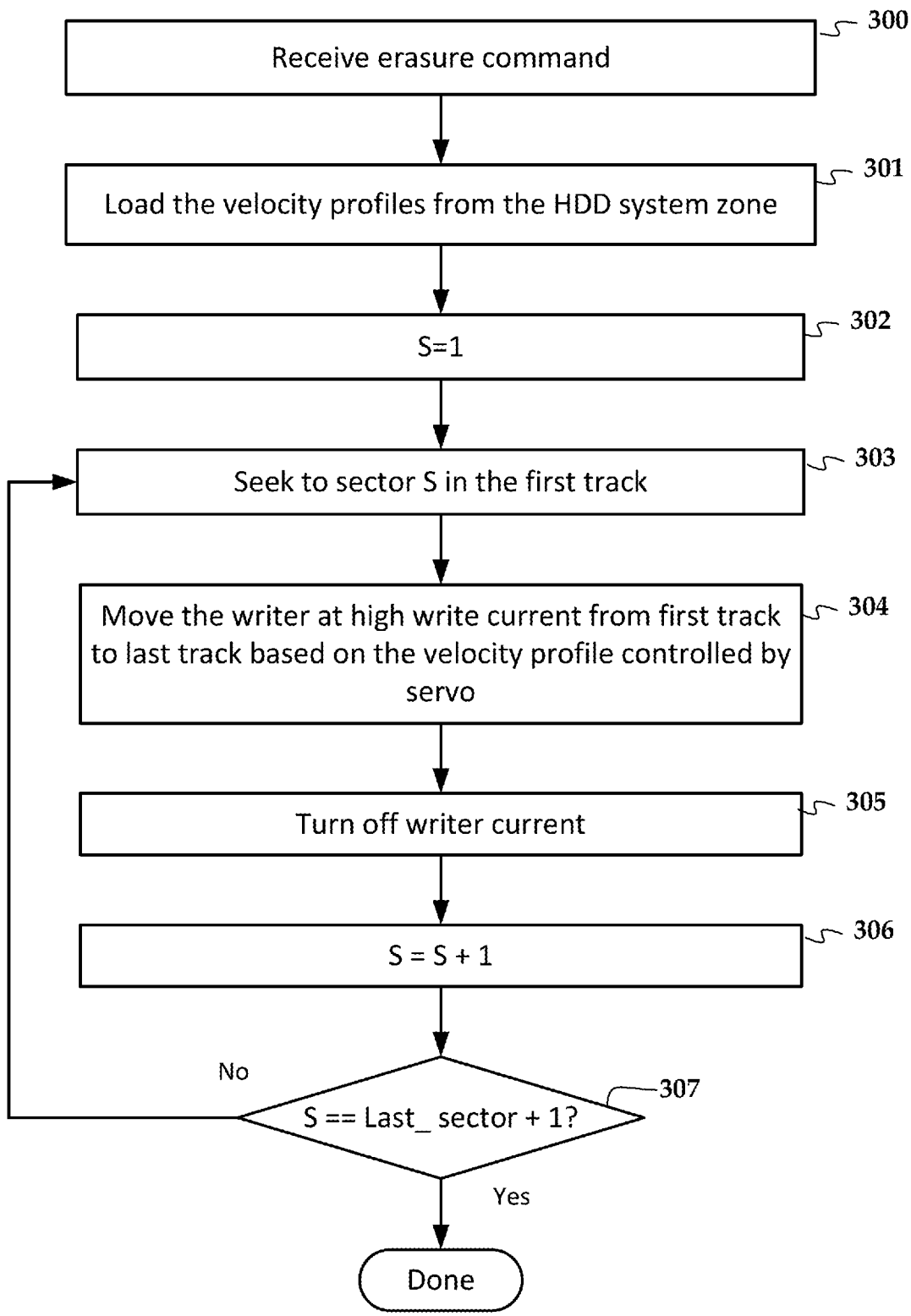

In FIG. 3, a flowchart shows how the erasure is performed in an HDD according to an example embodiment. The HDD receives 300 an erasure/sanitization command. The command may come from the host or may be self-generated. As an example of the latter, the drive could be set to automatically sanitize some or all data based on detection of a security breach. The HDD loads 301 the related parameters from the HDD system zone, including the velocity profiles determined in the process shown in FIG. 2. A sector counter S is initialized 302, e.g., to S=1 in this example, although may be initialized to any value, e.g., from zero to the maximum sector number for the track. The head is then moved to seek 303 to data sector S in the first track of the erasure. This first track may be the outermost or innermost track of a particular zone, the track nearest the disk OD or ID, etc.

Once over sector S, the writer is moved 304 at a high write current from the first track to a last track (e.g., from OD to ID, or vice versa) based on the velocity profile. The write current applies an erasure signal, e.g., random signal, pure tone. The movement of the writer can be controlled by the servo system as described elsewhere herein. After the movement 304 causes the head to reach the last track, the writer current is turned off 305, and the value of S is changed 306, e.g., incremented by one in this example. The operations 303-306 are repeated until the last sector is reached as determined at block 307.

Figure 4:
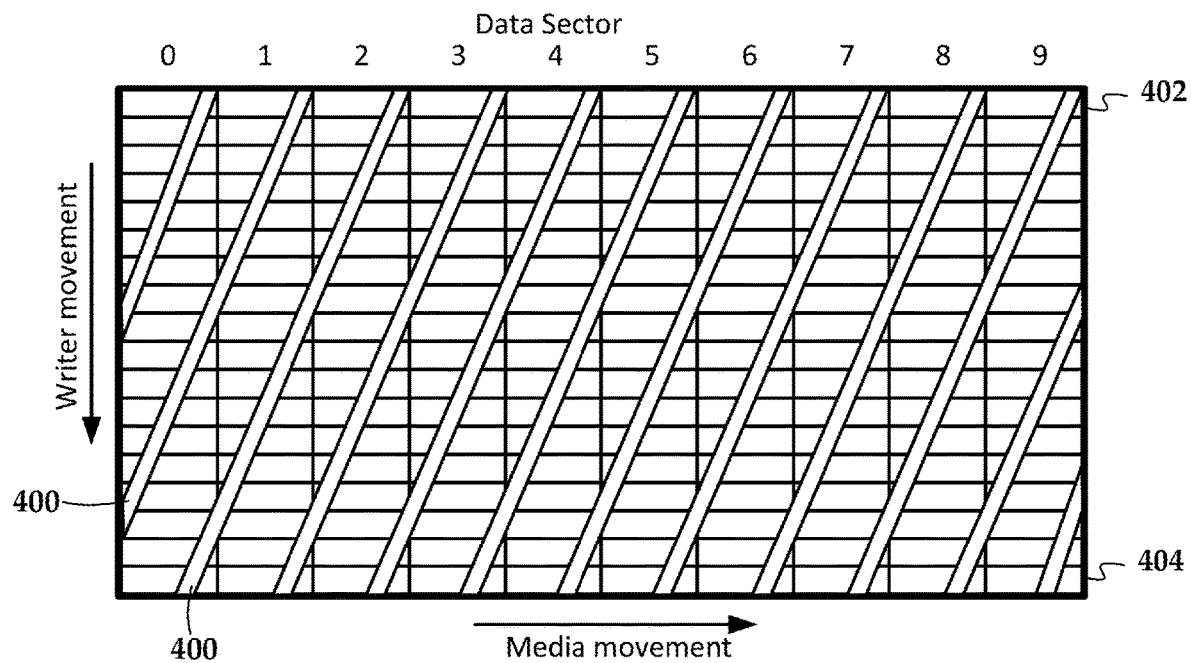
FIGS. 4-6 are diagrams showing sanitization schemes according to example embodiments.

In FIG. 4, a diagram schematically illustrates the process described in FIG. 3. Diagonal traces 400 represent erasure paths on a media. The paths 400 go from a first track 402 to a last track 404, each path starting in a different sector in the first track 402. While 10 sectors are shown in this example, a typical hard disk may have many more sectors per track. Also note that the number of sectors per track may vary based on a radial zone in which the track lies. Generally, tracks are larger at the outer diameter than the inner diameter, so it is more efficient to put more sectors in the outer tracks. This can be accomplished by dividing the disk surface into radial zones, each zone having a different number of sectors per track.

Figure 5:
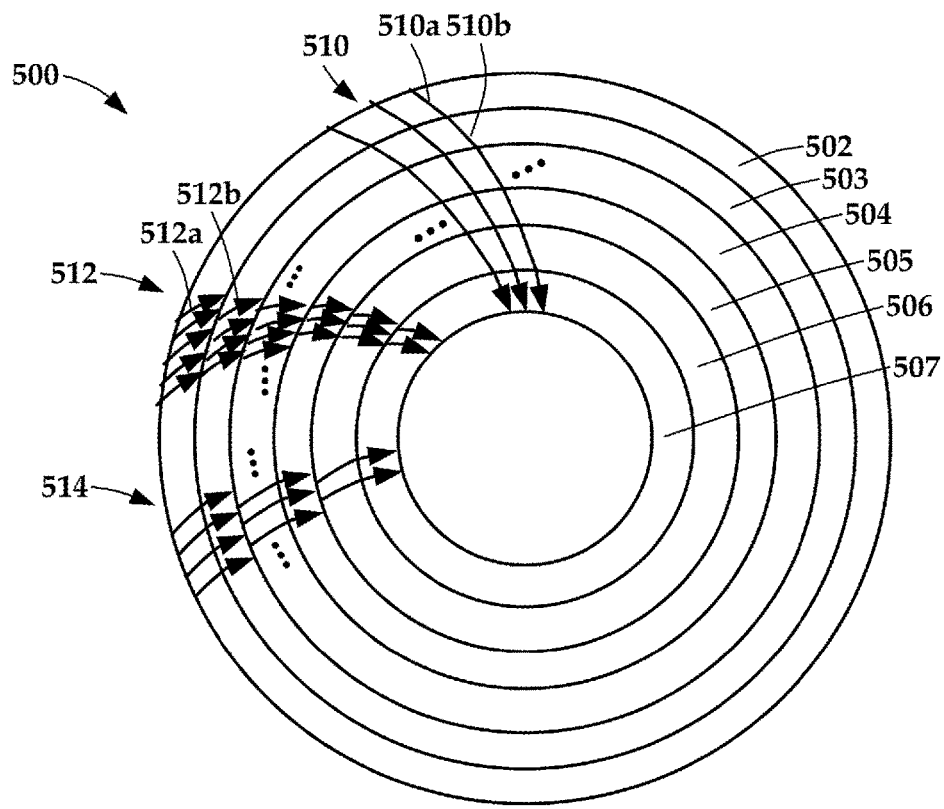

In FIG. 5, a diagram of a disk surface 500 shows how radially defined zones may affect erasure operations according to various embodiments. In this example, the disk surface 500 is divided into six zones 502-507, each having a different number of sectors per track within the zone. This may affect the trajectory of the write head when erasing within each zone. For full surface erasure, paths 510 are shown, each having different trajectories within each zone. For example, path 510 has trajectory 510a in zone 502 and trajectory 510b in zone 503.

Note that because the outer zone 502 has more sectors per track than inner zone 507 and each path 510 starts at one of the sectors in the outer zone 502, more than one erasure path 510 could intersect a sector in the inner zone 507. This will lead to extra erasure of the inner zones 503-507, which will ensure a maximum level of erasure although may require more full OD to ID passes than necessary to erase data on the inner zones. This will still be more efficient than a full erasure. In some embodiments, zone specific erasure paths 512 may be tailored for the specific sectors-per-track within each zone 502-507. In such a case, erasure paths 512a could be configured to intersect each sector just once in zone 502, erasure paths 512b could be configured to intersect each sector just once in zone 503, etc. These will avoid extra erasure but will involve many more seeks compared to paths 510, albeit smaller seeks. Also note that these zone specific paths 512 can be used for partial erasures. For example, if it is desired to just erase zone 503, then paths 512b could be executed without affecting the other zones 502, 504-507.

Erasure paths 514 represent a hybrid of the above approaches. Each erasure path 514 is configured to erase each sector of the outermost of two adjacent zones, e.g., paths 514 are configured to start at each sector in zone 502 and erase through both zones 502 and 503. This may lead to some extra erasure within zone 503, but may perform less extra erasure than paths 510, yet without requiring the number of seeks involved in using paths 512.

In the previous embodiments, erasure paths are shown starting at an outer diameter and moving towards an inner diameter. This can be convenient to implement, as the outer tracks will have the most sectors per track, therefore starting at the outer track will ensure that inner tracks have the same or greater level of erasure as the outer tracks. However, it is still possible to erase from inner tracks to outer tracks, or to use a combination of outer-to-inner and inner-to-outer seeks, as shown in the following figure.

Figure 6:
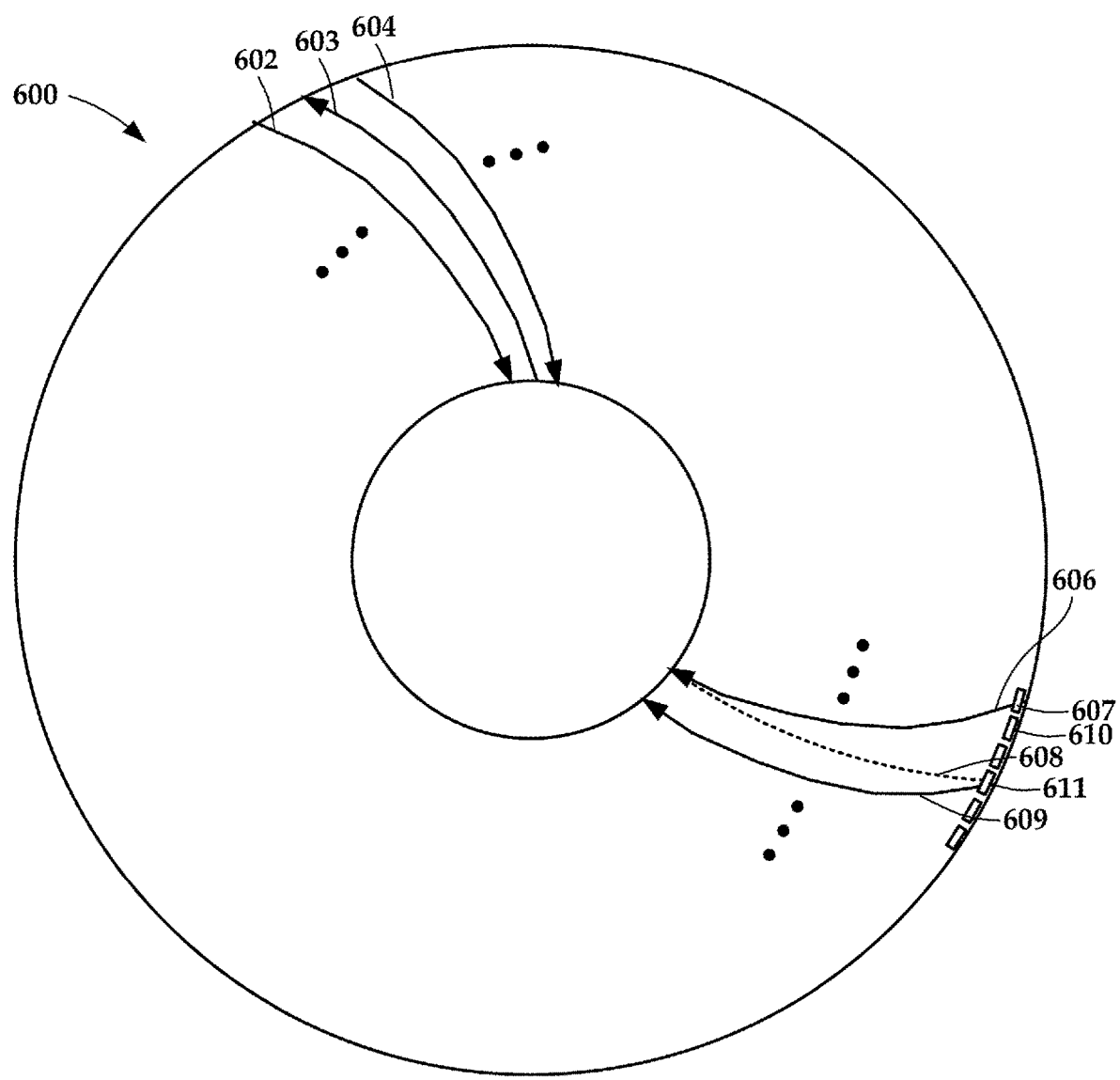

In FIG. 6, a diagram of a disk surface 600 shows variations on erasure operations according to one or more embodiments. As indicated by paths 602-604, an erasure can alternate between outer-to-inner seeks (paths 602 and 604) and inner-to-outer seeks (path 603). These paths 602-604 are shown between the disk OD and ID, however may be zone specific as shown in FIG. 5.

In some embodiments described above, the erase paths are described at starting at consecutive sectors on an outer track, e.g., a first pass starting at sector 1, a second pass starting at sector 2, etc. However, erasure operations need not be order-specific, so any sequence of sectors can be used. For example, as indicated in FIG. 6, a first erasure path 606 starts at a first sector 607 and ends near the ID of the disk surface 600. After the first erasure path 606 is complete, then the head is brought back to the OD along path 608 and instead of waiting for the disk to rotate to the next sector 610 after 607, it moves to the next available sector 611, which is determined by the seek speed of the actuator arm and the rotation speed of the disk. The next erasure path 609 starts at this first available sector 611 and proceeds similarly to the previous path 606. Eventually, all sectors on the outer track can be covered using this pattern. This example can be used, for example, to minimize rotational latency waiting for a particular sector on the outer track.

In the above examples, the drive may be configured to avoid energizing the write head when passing over servo marks while traversing the erasure paths. As noted above, servo marks (also sometimes referred to as servo sectors) are small segments of data written on the disk surface and used by the servo system to locate tracks and sectors. The servo marks are often pre-written on the disk surface during manufacture, although some drives may be capable of self-writing servo marks. During operation of the drive, the drive controller avoids energizing the write transducer while traversing servo marks, as this could result in parts of the disk surface (e.g., sectors, tracks) being unreadable. Thus, if the erasure processes described above are intended to allow the drive to be reused, then avoiding the erasure of servo marks could be one consideration when designing the erasure protocol.

In other embodiments, the erasure could occur without regards to servo marks. For example, of reuse of the whole drive is not required, then the destruction of servo marks is an additional measure that can help ensure the data is not recoverable. This would still leave open the possibility of component reuse, e.g., controller boards, actuators, disks, etc., which could be used for repair of other drives. In other embodiments, the drive could have a servo rewrite functionality such that a secondary user could perform a full erasure and servo mark rewrite, for example, to make the drive usable again. Or a firmware program could be used to reconstruct erased servo marks, e.g., by interpolating between non-erased or damaged servo marks that survived the erasure.

Figure 7:
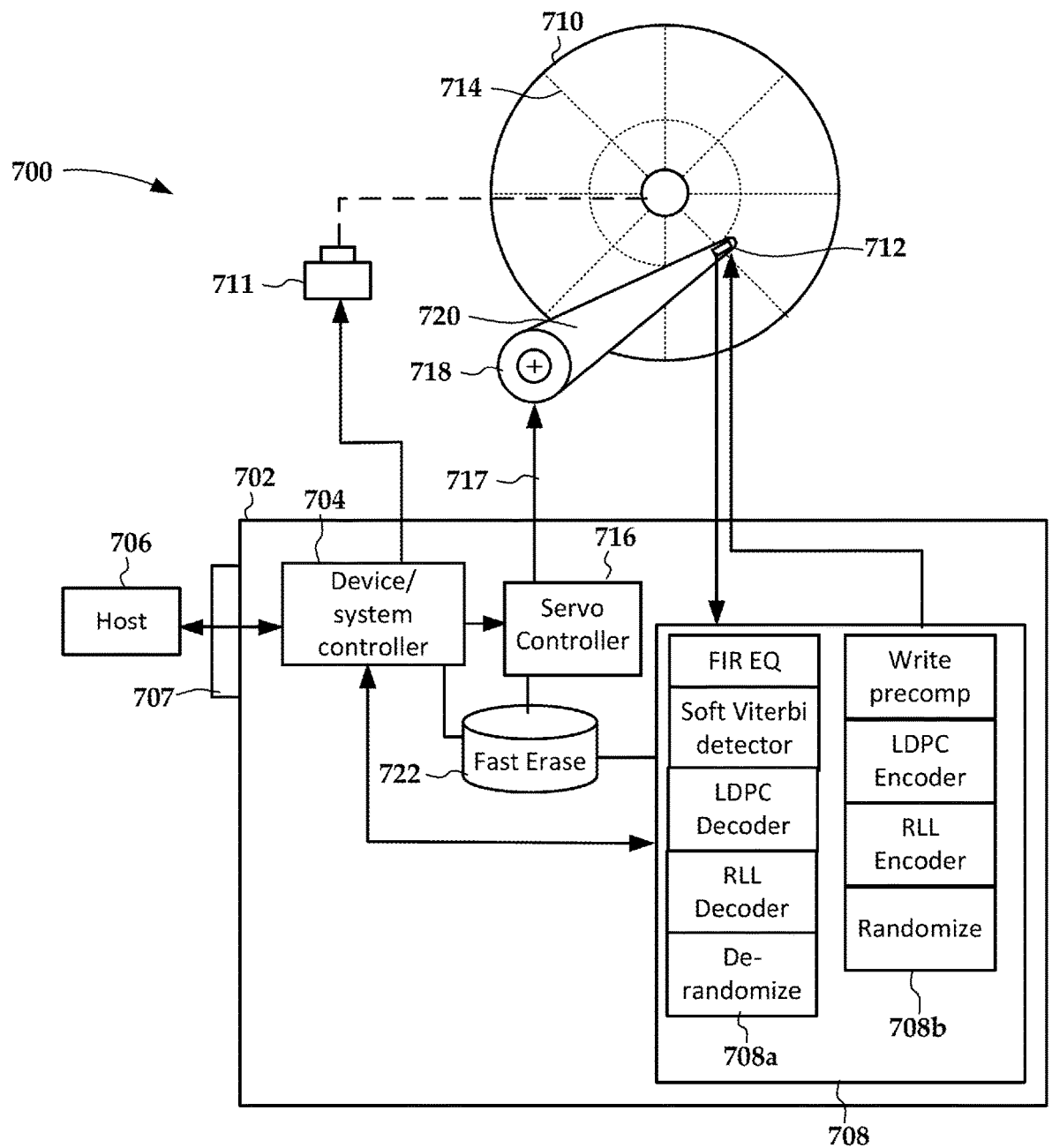
FIG. 7 is a block diagram of an apparatus according to an example embodiment.

In FIG. 7 a block diagram illustrates a data storage apparatus 700 (e.g., HDD) that may utilize a read channel according to example embodiments. The apparatus includes circuitry 702 such as one or more device/system controllers 704 that process read and write commands and associated data from a host device 706 via a host interface 707. The host interface 707 includes circuitry that enables electronic communications via standard bus protocols (e.g., SATA, SAS, PCI, NVMe, etc.). The host device 706 may include any electronic device that can be communicatively coupled to store and retrieve data from a data storage device, e.g., a computer, a server, a storage controller. The device controller 704 is coupled to one or more read/write channels 708 (shown here as separate read channel 708a and write channel 708b) that read from and write to a recording media, which in this figure are surfaces of one or more magnetic disks 710 that are rotated by a spindle motor 711.

The read/write channels 708 generally convert data between the digital signals processed by the device controller 704 and the analog signals conducted through one or more heads 712 during read and write operations. The heads 712 may include one or more read transducers each capable of reading one surface of the disk 710. The heads 712 may also include respective write transducers that concurrently write to the disk 710. The write transducers may be configured to write using an energy assist (e.g., heat, microwave), and may write in various track configurations, such as conventional tracks, shingled magnetic recording (SMR), and interlaced magnetic recording (IMR).

The read/write channels 708 may include analog and digital circuitry such as digital-to-analog converters (DACs), analog-to-digital converters, detectors, decoders, timing-recovery units, error correction units, etc. The read/write channels 708 are coupled to the heads 712 via interface circuitry that may include preamplifiers, filters, etc.

In addition to processing user data, the read/write channels 708 read servo data from servo marks 714 on the magnetic disk 710 via the read/write heads 712. The servo data are sent to one or more servo controllers 716 that use the data to provide position control signals 717 to one or more actuators, as represented by voice coil motors (VCMs) 718. In response to the control signals 717, the VCM 718 rotates an arm 720 upon which the read/write heads 712 are mounted. The position control signals 717 may also be sent to microactuators (not shown) that individually control each of the heads 712, e.g., causing small displacements at each read/write head.

As indicated by fast erasure instructions 722, the apparatus 700 can perform a spiral erasure of a full disk surface or part thereof. This can erase part of each sector, such that the data cannot be recovered. For example, by erasing at least x of every 100 bits of data written to each sector, a x % or higher error rate can be induced into the sector causing the data to be undecodable by the read/write channels 708. The value of x can be chosen based on recovery capabilities of the read channel. Various transformations used by the read/write channels 702a-b, e.g., low-density parity check (LDPC) encoding/decoding, run-length-limited (RLL) encoding/decoding, randomization, etc., can make the unerased bits of data on the disk unusable as these bits would not be recognizable as user data unless processed by the particular decoding sections of the read/write channel.

Figure 8:
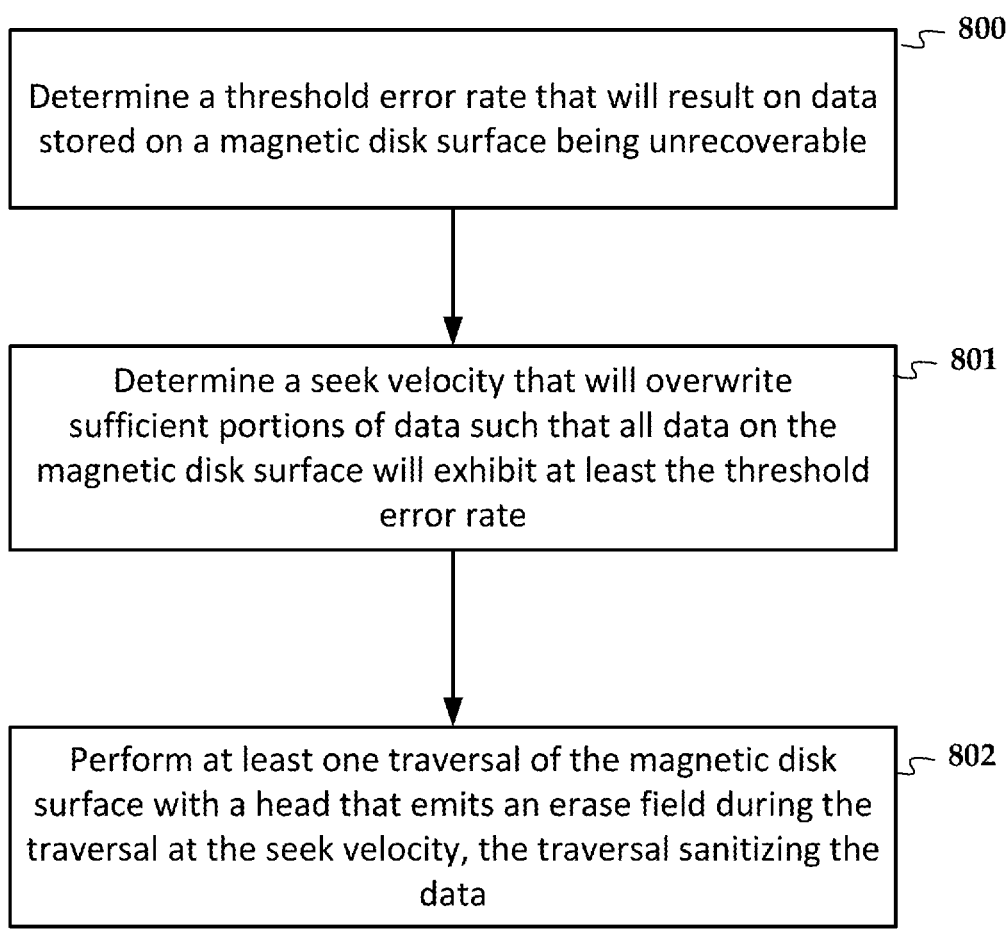
FIG. 8 is a flowchart of a method according to an example embodiment.

In FIG. 8, a flowchart shows a method according to an example embodiment. The method involves determining 800 a threshold error rate that will result on data stored on a magnetic disk surface being unrecoverable. The method also involves determining 801 a seek velocity that will overwrite sufficient portions of data such that all data on the magnetic disk surface will exhibit at least the threshold error rate. When an erasure is commanded, the drive performs at least one traversal 802 of the magnetic disk surface with a head that emits an erase field during the traversal at the seek velocity. The traversal sanitizes the data stored on the magnetic disk.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

What is claimed is:

1. A method, comprising:
   determining a threshold error rate that will result on data stored on a magnetic disk surface of a disk drive being unrecoverable;
   determining a seek velocity that will overwrite sufficient portions of the data such the data will exhibit at least the threshold error rate; and
   performing at least one traversal of the magnetic disk surface with a head of the disk drive that emits an erase field during the at least one traversal at the seek velocity, the at least one traversal sanitizing the data.

2. The method of claim 1, wherein the seek velocity is a function of radial location on the magnetic disk surface.

3. The method of claim 1, wherein the at least one traversal begins on a first sector of an outer diameter of the magnetic disk surface and ends on an inner diameter of the magnetic disk surface.

4. The method of claim 3, further comprising performing additional traversals starting on other sectors following the first sector and ending in the inner diameter.

5. The method of claim 4, wherein at least one of the additional traversals starts at the inner diameter of the magnetic disk surface and ends at the outer diameter of the magnetic disk surface.

6. The method of claim 4, wherein the other sectors are chosen to reduce a rotational latency between traversals.

7. The method of claim 1, wherein the threshold error rate comprises a maximum readback error rate of the disk drive plus an error rate margin.

8. The method of claim 1, wherein the threshold error rate is at least twice a maximum readback error rate of the disk drive.

9. The method of claim 1, wherein the magnetic disk surface is divided into a first zone and a second zone, and wherein the at least one traversal sanitizes first data in the first zone but does not affect second data stored on the second zone.

10. The method of claim 1, wherein the data is formed by randomizing and encoding user data such that bits of sectors that are not erased during the traversal cannot be used to recover the user data.

11. A disk drive, comprising:
a reserved data storage that stores a seek velocity that will overwrite sufficient portions of data a magnetic disk surface of the disk drive such the data on will exhibit at least a threshold error rate that will result on the data being unrecoverable; and
a controller coupled to a write head that is operable to write to the magnetic disk surface, the controller operable to, in response to a sanitization command, perform at least one traversal of the magnetic disk surface with the write head emitting an erase field during the at least one traversal at the seek velocity, the at least one traversal sanitizing the data.

12. The disk drive of claim 11, wherein the seek velocity is a function of radial location on the magnetic disk surface.

13. The disk drive of claim 11, wherein the at least one traversal begins on a first sector of an outer diameter of the magnetic disk surface and ends on an inner diameter of the magnetic disk surface.

14. The disk drive of claim 13, wherein the controller is further operable, in response to the sanitization command, to perform additional traversals starting on other sectors following the first sector and ending in the inner diameter.

15. The disk drive of claim 14, wherein at least one of the additional traversals starts at the inner diameter of the magnetic disk surface and ends at the outer diameter of the magnetic disk surface.

16. The disk drive of claim 14, wherein the other sectors are chosen to reduce a rotational latency between traversals.

17. The disk drive of claim 11, wherein the threshold error rate comprises a maximum readback error rate of the disk drive plus an error rate margin.

18. The disk drive of claim 11, wherein the threshold error rate is at least twice a maximum readback error rate of the disk drive.

19. The disk drive of claim 11, wherein the magnetic disk surface is divided into a first zone and a second zone, and wherein the at least one traversal sanitizes first data in the first zone but does not affect second data stored on the second zone.

20. The disk drive of claim 11, wherein the seek velocity is determined and stored in the reserved data storage during a factory qualification of the disk drive.

* * * * *